United States Patent [19]

Kuriyama

[11] Patent Number: 4,891,763

[45] Date of Patent: Jan. 2, 1990

[54] NC PROGRAM EDITING AND PROGRAMMING DEVICE

[75] Inventor: Jyuzo Kuriyama, Nagoya, Japan

[73] Assignee: Brother Kogyo Kabushiki Kaisha, Nagoya, Japan

[21] Appl. No.: 41,743

[22] Filed: Apr. 23, 1987

[30] Foreign Application Priority Data

Apr. 24, 1986 [JP] Japan ................................ 61-95797
Apr. 30, 1986 [JP] Japan ................................ 61-99719

[51] Int. Cl.[4] .............................................. G05B 19/42
[52] U.S. Cl. ............................ 364/474.25; 364/192; 364/474.26
[58] Field of Search ............... 364/167, 171, 191–193, 364/474, 475, 474.22, 474.24, 474.25, 474.26; 318/568

[56] References Cited

U.S. PATENT DOCUMENTS

| | | | |
|---|---|---|---|
| 4,099,230 | 7/1978 | Mead | 364/200 |
| 4,519,026 | 5/1985 | Nozawa et al. | 364/167 |
| 4,556,957 | 12/1985 | Ichikawa | 364/171 |
| 4,606,001 | 8/1986 | Rieben et al. | 364/474.25 |
| 4,646,228 | 2/1987 | Ikeda | 364/474.26 |
| 4,660,148 | 8/1987 | Kishi et al. | 364/474 |
| 4,723,203 | 2/1988 | Kishi et al. | 364/191 |

Primary Examiner—John R. Lastova
Attorney, Agent, or Firm—Cushman, Darby & Cushman

[57] ABSTRACT

An automatic programming device has a display structure, an input structure for entering graphical data in accordance with information that is displayed by the display, and a threshold level variation device for varying a threshold level which forms a reference for rounding-off numerical calculation errors during graphical data processing. The programming device also has a reading structure for reading an NC program created in NC data, and a calculator which analyzes the NC program read via the reading structure, generates pattern information specified by each graphical element of points, line segments and circular arcs, and generates tool path information specifying the sequence of tool progress on the pattern.

3 Claims, 11 Drawing Sheets

| NP | X(NP) | Y(NP) |
|---|---|---|
| 1 | 0.0 | 30.0 |
| 2 | 50.0 | 80.0 |
| 3 | 100.0 | 30.0 |
| 4 | 50.0 | 30.0 |

FIG.10(b)

| NL | LS(NL) | LE(NL) |
|---|---|---|
| 1 | 0 | 1 |
| 2 | 1 | 2 |
| 3 | 1 | 3 |

FIG.10(c)

| NA | IAS(NA) | IAE(NA) | IAC(NA) |
|---|---|---|---|
| 1 | 3 | 2 | 4 |

FIG.11

| NQ | IQU(NQ) | IQC(NQ) |
|---|---|---|
| 1 | 1 | 0 |
| 2 | 2 | 0 |
| 3 | 3 | -4 |
| 4 | 1 | 0 |

NC PROGRAM EDITING AND PROGRAMMING DEVICE

BACKGROUND OF THE INVENTION

The present invention relates to an automatic programming device for simply creating a numerical control (NC) program for numerically controlled machine tools.

DESCRIPTION OF THE PRIOR ART

Automatic programming devices for numerically controlled machine tools often use devices which construct pattern data by means of an internal computer, input each type data interactively as patterns are displayed, process and edit pattern data and which create numerical data.

Problems which said type of computer-based automatic programming device cannot avoid are errors of quantization that occur when digital numeric calculations are made of pattern data. These problems are due to unavoidable errors of quantization which occur when geometrically-based continuous quantities are handled in pattern processing, that is, the computer handles these as digital quantities vis-a-vis the requirement for numerical calculations involving naturally occurring irrational numbers. In order to be capable of disregarding these errors, calculations may be made with digital quantities having an adequate number of bits, but this is not practical in view of limitations in computer memory capacity and calculation speed.

Accordingly, in order to absorb the numerical calculation error accompanying pattern processing, an appropriate threshold level (th) is determined, and when the distance between two observed points is less than the threshold level (th), these two points are regarded as one point; when the distance between the two observed points is greater than the threshold level (th), the two points are regarded as separate points, and a so-called rounding-off process is thus performed.

The threshold, the value which forms the reference for the aforementioned rounding-off process, is set at a constant value in conventional devices. Thus, the results of the rounding-off process will differ depending on the magnitude of the patterns. Even with analog graphics; limitaions arise such as when a spot which requires detailed pattern processing undergoes the rounding-off process and cannot be processed, or conversely, even a spot that may be rough-processed, cannot be processed unless columns of accurate numerical values are input, and if they are not, said processing cannot be performed, the operator's design is difficult to duplicate and operation becomes problematic.

In addition to the aforesaid limitations, when a system has a fixed threshold level (th), the accuracy or inaccuracy of the patterns cannot be checked and, by specifying the data input units in either inch or metric (mm) systems, nonconformities arise from differences in the results of processing pattern information.

There are two methods of procedures for creating numerically controlled (NC) programs with an automatic programming device.

The first method requires that, in order to define the tool path, pattern information derived from various pattern elements such as the line segments, circular arcs and coordinates for every required point is first calculated and sequentially input, and thereafter the tool path is defined by assigning a sequence to said defined points.

The second method involves calculating and entering the coordinates of the sequentially required points as the tool path is defined.

Whichever method is used, the pattern information defining tool path configuration and tool path information defining the fixed route of the tool path must be read and input from the drawings made by the operator. The automatic programming device creates and outputs numerical control (NC) programs pursuant to the two types of input and defined information described above. Hence, NC programs written in numerical control data (NC data) are difficult to understand compared to tool path information and pattern information which can be intuitively understood. Thus, many automatic programming devices store in memory not only the generated NC program but also pattern information and tool path information in auxiliary memory such as floppy disk devices, and are capable of future modification and editing. The creation of new NC programs can be created with little effort by directly modifying the NC program pattern information and tool path information.

In conventional automatic programming devices, although new NC programs can be created from pattern information and tool path information entered by the operator, pattern information and tool path information cannot be conversely created from the NC program.

Hence, when attempting to create new NC programs by modifying or editing NC programs stored on paper tape, the NC program written in numerical control data must be directly modified or edited because pattern information cannot be processed by shape; therein resides a limitation leading to many complications.

Additionally, there is no general compatibility of memory systems for pattern information and tool path information stored on floppy disks or other devices among the different automatic programming devices for various types of machines. Thus, although pattern and tool path information may be entered and stored in one device, the same pattern and tool path information cannot be used by another device, with the resulting limitation that the same information must be reentered in each automatic programming device.

SUMMARY OF THE INVENTION

An object of the present invention is to provide an automatic programming device which is capable of avoiding nonconformities caused by rounding errors.

Another object of the invention is to provide an automatic programming device which is capable of detailed processing.

Another object of the invention is to provide an automatic programming device which is capable of modifying, editing and storing the pattern and tool path information of NC programs provided on paper tape.

A further object of the invention is to provide an automatic programming device which is capable of exchanging pattern and tool path information with automatic programming devices of different types of machines by means of the numerical control data of NC programs.

Accordingly, the present invention firstly provides an automatic programming device comprising a display means, an input means for entering pattern data in accordance with information displayed on said display means, and a means of threshold level veriation for varying the threshold level which forms the rounding-off reference for quantization of digital numeric calculations during pattern data processing.

In accordance with the aforesaid construction, the threshold level, which forms the rounding-off reference for digital numerical calculation errors, is varied corresponding to the processed points of the pattern, and since values may be designated which are appropriate for said points, nonconformities due to rounding-off errors can be avoided.

The invention secondly provides an automatic programming device comprising a means of threshold level variation wherein a threshold level is calculated from selected enlargement or reduction ratios when a patern is displayed on the display means.

In accordance with the aforesaid construction, since when patterns are displayed on the display means, the enlargement and reduction ratios approximately correspond to the precision (accuracy of detail) with which the operator processes pattern data at said points, the threshold level can be automatically modified and set at a value corresponding to the operating sensitivity of the operator, i.e., corresponding to the operator's design, and said automatic modification and setting of threshold levels can be suitably performed from detailed to rough processing without special operations.

Thirdly, the invention provides an automatic programming device comprising a display means, an input means for entering data in accordance with information displayed by said display means, a reading means for reading NC programs created in NC data, and a means of arithmetic operations which analyzes the NC program read by said reading means and generates the pattern information specified by each graphical element such as points, line segments and circular arcs, and generates the tool path information which specifies the sequence of progress according to said pattern information.

In accordance with the aforesaid construction, NC programs created in numerical control data (NC data) are read, their contents are analyzed and calculated, and pattern and tool path information can be generated by mean of reverse conversion. Therefore, the received NC programs are reduced to pattern and tool path information and may be modified, edited and stored. Also, said pattern and tool path information may be exchanged between mutually different automatic programming devices by means of the temporarily generated NC program.

Other and further objects, features and advantages of the invention will become appear more fully from the following description.

BRIEF DESCRIPTION OF THE DRAWINGS

FIGS. 1 through 5 show the first embodiment of the invention.

FIGS. 6 through 21 show the second embodiment of the invention.

DETAILED DESCRIPTION OF THE PREFERRED EMBODIMENTS

The First Embodiment

Referring now to the drawings, the first embodiment of the invention will be concretely described.

Figure 1:
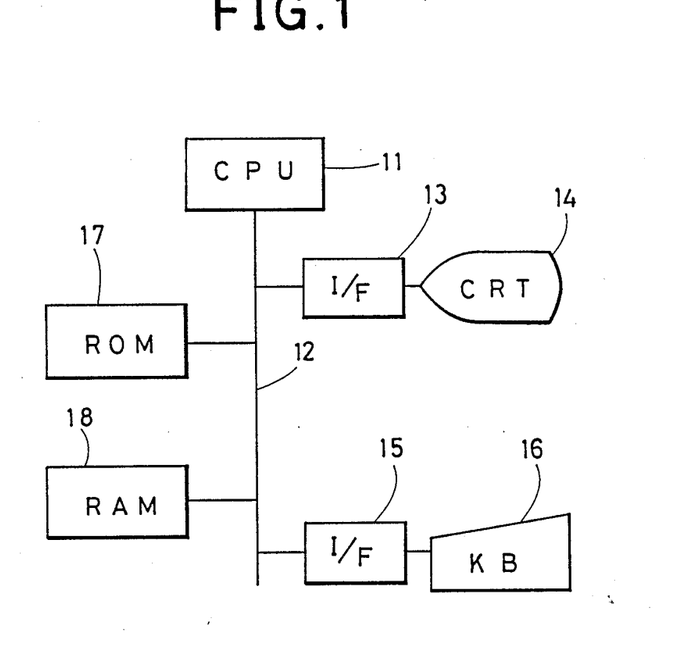
FIG. 1 is a block diagram of the automatic programming device embodying the invention.

As shown in FIG. 1, display means (CRT) 14 is connected via interface 13 to common bus 12 which is connected to the central processing device (CPU) 11 wherein is displayed a pattern and each type of operational information. Keyboard 16, with character and numeric keys, is connected to common bus 12 via interface 15, and keyed information is transmitted to the central processing device (CPU). Keyboard 16 is the input means for entering data.

Furthermore, read-only memory (ROM) 17, which is stored in the control program, and working memory 18, which temporarily stores processing data, are connected to common bus 12.

Figure 5:
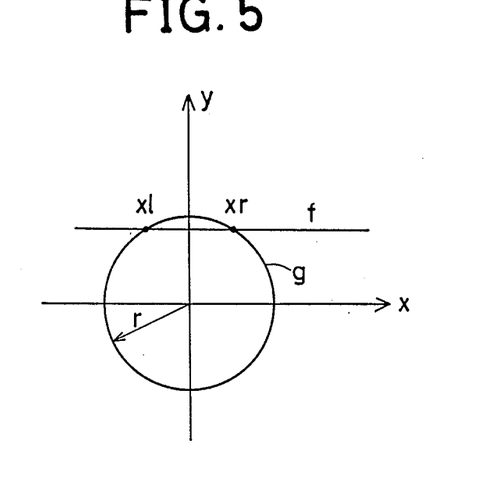
FIG. 5 is a plan view showing the principles.

Referring to FIG. 5, the principles of the invention will be described. The equations describing straight line f and circle g are as follows:

$$f: y = d \quad (1)$$

$$g: x^2 + y^2 = r^2$$

The x coordinates of the intersections of straight line f and circle g are determined by the following equation:

$$x_r = \sqrt{r^2 - d^2} \quad (2)$$

$$x_1 = -\sqrt{r^2 - d^2}$$

Since d and r in equation (1) are provided as digital values in electronic computers, the x coordinates determined via equation (2) become digital values. When the threshold level is a set value (th=0.1), the coordinates of the points of intersection of a straight line and a large radius circle can be determined, but the points of intersection of a straight line vis-a-vis a small radius circle cannot be determined, which leaves the question of contact indeterminate; computational results are as shown in Table 1. However, because the present invention possesses a means of varying the threshold level, appropriate graphic processing can be performed. For example, the present invention observes the use of a zoom function in the display of reductions or enlargements of pattern data by the display means, and said threshold level is varied in correspondence with the zoom distance. Hence, because a short zoom distance is selected when detailed processing is required and a large zoom distance is selected when rough processing is necessary, the threshold level is varied in correspondence with and is directly proportional to the zoom distance.

TABLE 1

Calculation Results

| | |
|---|---|
| r = 101 | r = 0.101 |
| d = 100 | d = 0.1 |
| ↓ | ↓ |
| $X_r$ = 14.17 | $X_r$ = 0.01417 |
| $X_l$ = 14.17 | $X_l$ = 0.01417 |
| th $\triangleq$ 0.1 | |
| $X_r - X_l >$ th | $X_r - X_l <$ th |
| $X_r'$ = 14.17 | $X_r'$ = 0 = $X_l'$ |
| $X_l'$ = −14.17 | |

Hereinafter follows a brief explanation of the means of operation.

Figure 2A:
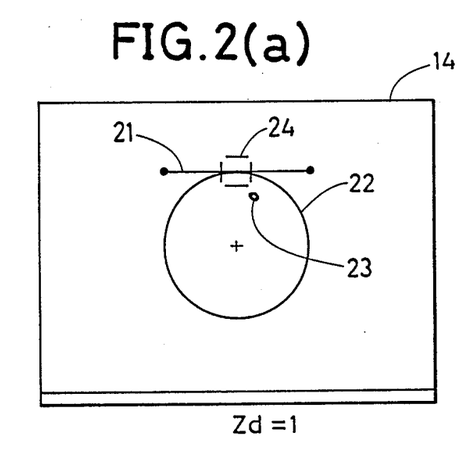
FIG. 2(a) is an image diagram showing the conditions which are displayed to the display device wherein the pattern data zoom distance=1.

An example of the processing of pattern data derived from line segment 21 and circular arc 22 as shown in FIG. 2(a) is explained herewith. If detailed processing is required when managing the region of point of intersection 24 of line segment 21 and circular arc 22 indicated by cursor 23, operations on said area 24 are conducted under enlarged-display condition; conversely, if rough processing is required with observation of the entire object, then operations on said pattern data 21 and 22 are conducted under reduced-display condition. The zoom function is employed in the enlarged and reduced display of the pattern.

Figure 3:
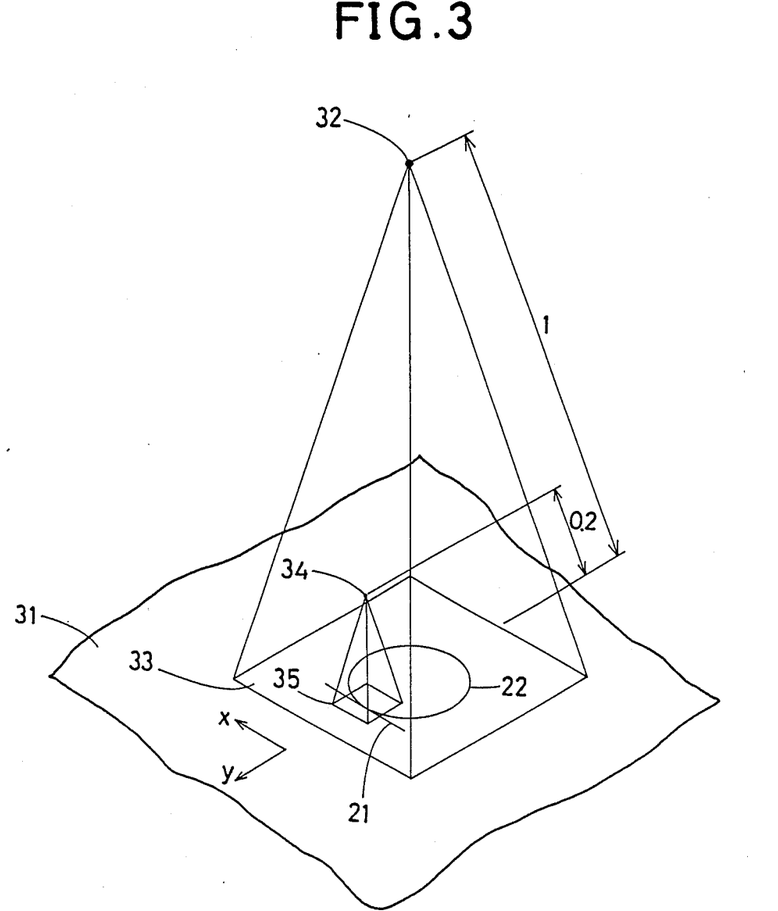
FIG. 3 is a perspective diagram illustrating the zoom function.

FIG. 3 is a perspective illustration describing the zoom function. Pattern data 21 and 22 are drawn on the assumed plane 31. Frame 33, viewing plane 31 at a view angle determined from viewpoint 32 located above said plane 31, is displayed on the display means CRT 14 as the reference image. The viewpoint approaches plane 31, and if frame 35 is displayed viewed from viewpoint 34, an enlargement is displayed. If the distance between viewpoint 32 and plane 31 is designated as 1, then the value expressing the distance between viewpoint 34 and plane 31 (for example 0.2) is called the zoom distance zd for said frame. If the viewpoint is placed farther away from reference viewpoint 32, i.e., if zoom distance zd becomes greater than 1, a reduced pattern is displayed. An optionally enlarged or reduced image is displayed by means of indicating the center point of the zoom distance zd and coordinates of viewpoints 32 and 34 to plane 31.

Figure 2B:
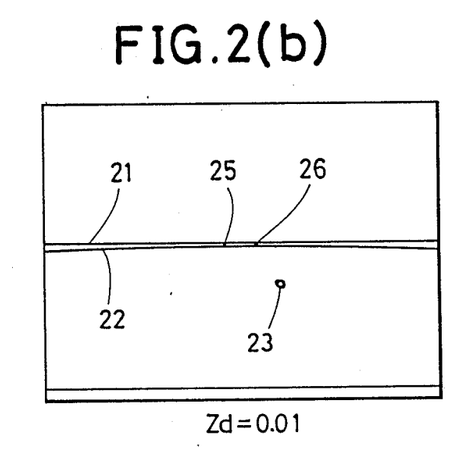
FIG. 2(b) is an image diagram showing a displayed example wherein the pattern is enlarged by means of the zoom function when detailed processing is required.

Referring again to FIG. 2, when detailed processing is required, patterns are displayed enlarged by means of the zoom function. The region of intersection of line segment 21 and circular arc 22 is indicated by cursor 23 and, when zoom distance zd is designated 0.01, the information as shown in FIG. 2(b) is displayed. When operations are performed to determine the points of intersection for line segment 21 and circular arc 22 under these conditions, two points of intersection, 25 and 26, are distinguished because the threshold level determined by the rounding-off process was sufficiently small. Thus, two intersection points, 25 and 26, are recorded and can be used in pattern data processing thereafter.

Figure 2C:
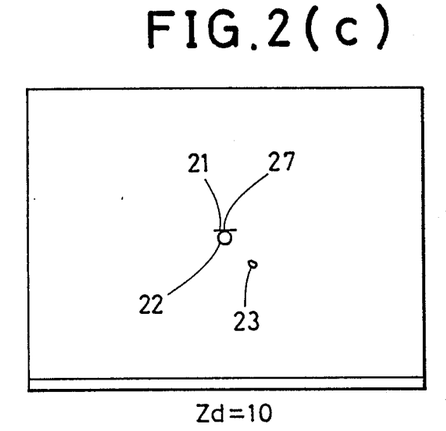
FIG. 2(c) is an image diagram showing a displayed example wherein the pattern is condensed by means of the zoom function when rough processing is required.
Figure 2D:
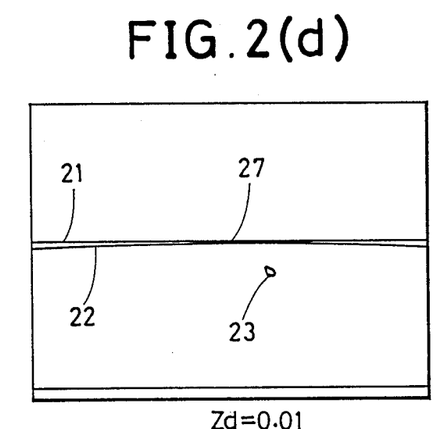
FIG. 2(d) is an image diagram showing an enlargement of the contact region following rough processing.

When rough processing is required, however, patterns are reduced and displayed via the zoom function. If the zoom distance zd is designated 10, pattern data 21 and 22 is displayed reduced as shown in FIG. 2(c). When operations are performed to determine the points of intersection of line segment 21 and circular arc 22 under these conditions, the distance between the two points of intersection becomes smaller because the threshold level determined via the rounding-off process becomes larger, and only one point of intersection is presumed, i.e., the contact point 27 is determined. Thereupon, contact point 27 is recorded and can be used in pattern data processing hence. Thereafter, even if the region of contact point 27 is displayed enlarged by means of the zoom function, only the one contact point 27 will be displayed between line segment 21 and circular arc 22, as shown in FIG. 2(d).

Processing of graphical data reflecting the operator's design can be conducted by means of the correspondence of the threshold level (th) to the zoom distance zd because, when the operator requires detailed processing, patterns are displayed enlarged via the zoom function and operations are conducted as authentication is performed and, when rough processing is necessary, patterns are displayed reduced, and operations are conducted as authentication of the graphics for the entire object are performed.

Figure 4:
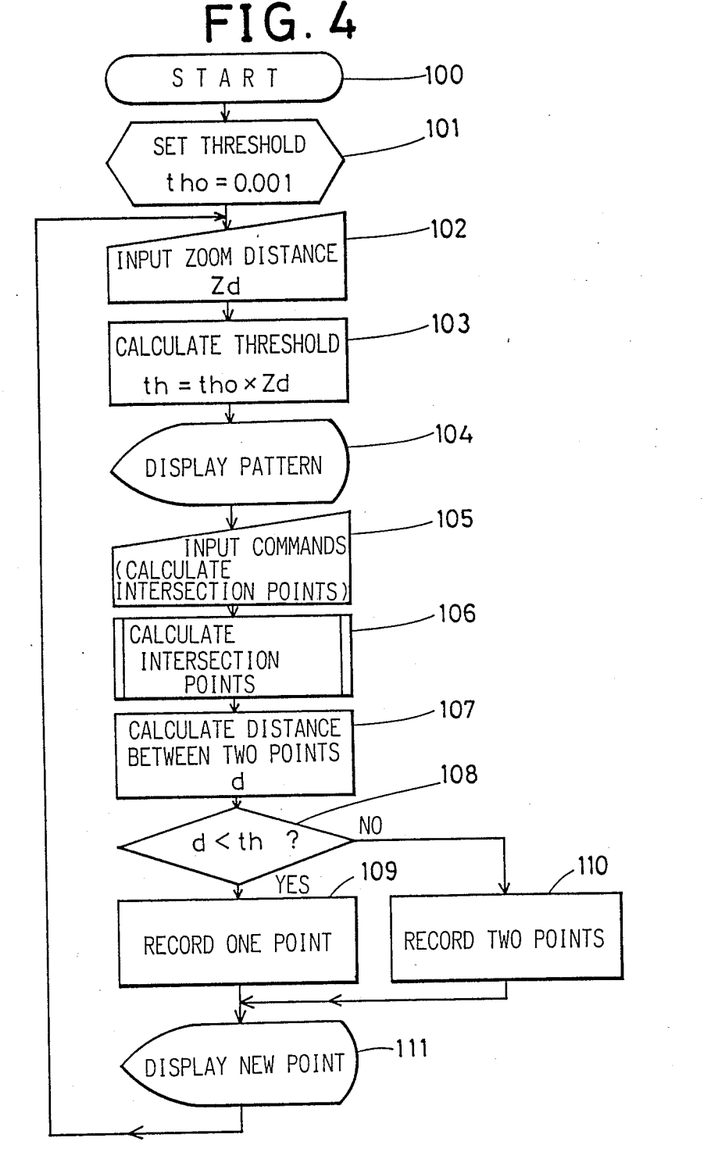
FIG. 4 is a flow chart showing the actual process.

FIG. 4 is a flow chart showing the actual processing.

When processing begins, the threshold level (th), which becomes the reference, is set at zero (th0) in step 101. This reference threshold level th0 is the threshold level used when the zoom function is not employed, i.e., when the zoom distance zd=1; for example the setting th0=0.001 (mm).

Next, in step 102, when the zoom distance zd is entered from keybaord 16, the process continues to step 103 where the ultimate threshold level (th) is calculated. The ultimate threshold level (th) is calculated and stored in memory as the value of the reference threshold level (th) multiplied by the zoom distance zd (th=th0×zd). Thus, the ultimate threshold level (th) is set at a value proportional to the zoom distance zd, i.e., (th) is set at a value inversely proportional to the enlargement or reduction ratios.

In step 104, enlarged or reduced patterns are displayed corresponding to the input zoom distance zd and, in step 105, are ready for commands entered through the keyboard. In step 105, when a command is entered, for example a command to determine the points of intersection of line segment 21 and circular arc 22, the process continues to step 106, where numerical calculations are performed based on said input commands, for example the calculation of the coordinates of said points of intersection.

Thereafter, in step 107, the distance (d) between the two points computed in step 106 is calculated, then in step 108, the distance (d) between said two points is checked to see whether or not it is less than the ultimate threshold level (th) determined in step 103. When distance (d) is less than the ultimate threshold level (th), a decision is made to regard the two points determined in step 106 as a single point for processing; the process continues to step 109 wherein the midpoint between said two points is determined and the coordinates of said midpoint are stored in memory. However, when the distance (d) is greater than the ultimate threshold level (th), a decision is made to regard the two points determined in step 106 as two separate points and the process continues to step 110 wherein the coordinates of the respective points are stored in memory.

In step 111, the new points stored in memory, which were determined in steps 109 or 110, are displayed as spots in the screen image. Thereafter, the process returns to step 102, and the aforementioned processes are repeated.

In the aforesaid flow chart, steps 107 to 110 indicate the rounding-off process wherein errors of numerical calculations are rounded-off during pattern data processing; step 103 performs the means of variation wherein the threshold level, which forms the reference for said rounding-off process, is varied.

As described heretofore, the present invention possesses the superior advantages of being capable of performing the rounding-off process of pattern data in accordance with the operator's design or operational sensitivity, and accurately performing processing from detailed to rough processing without any special operations because whenever the threshold level (th), which forms the reference for the rounding-off process, is displayed by the display means CRT 14, its value is calculated from the zoom distance Zd, which corresponds to the selected enlargement or reduction ratio.

Of course, the threshold level vereation means is not restricted to a means in correspondence with the zoom distance Zd as described in the aforesaid embodiment, for example, it is possible to enter the value of the desired threshold level directly via the keyboard.

The Second Embodiment

The second embodiment of the invention is explained hereinafter in accordance with the drawings.

Figure 6:
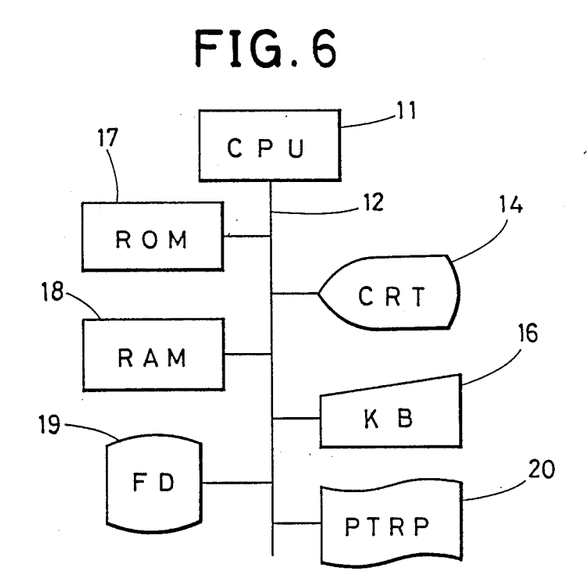
FIG. 6 is a block diagram of the automatic programming device embodying the invention.

FIG. 6 is a block diagram of the automatic programming device concerned to the present invention.

Read-only memory (ROM) 3, which contains the primary control program, working memory (RAM) 18, which temporarily stores the processing data for the pattern data, and the floppy disk device 19, which stores in memory the NC data, and the pattern data etc., are connected to common bus 12, and the central processing device CPU 11 is connected thereto. Additionally, pattern information, display means (CRT) 14, which displays all types of operational information, keyboard 16, and paper tape reader and punch 20, which reads and punches the paper tape, are connected to said same common bus 12.

Paper tape reader and punch 20 constitutes the reading means for reading the NC program.

An explanation of a brief graphic example follows hereafter vis-a-vis pattern information and tool path information.

Figure 7:
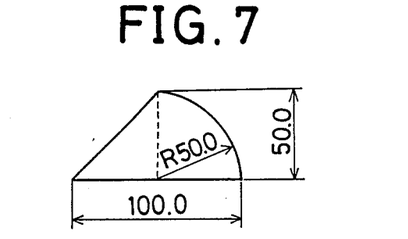
FIG. 7 is an explanatory diagram showing the processed object.
Figure 8:
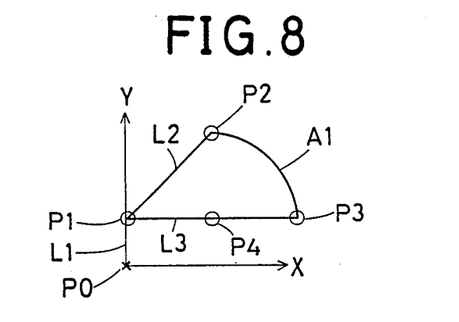
FIG. 8 is an explanatory diagram showing the processed object via X-Y coordinates.

A graphic example is shown in FIG. 7, showing a drawing of an abbreviated fan-shaped processing object. This fan-shaped pattern is determined by two line segments, L2 and L3, and circular arc A1, which form its perimeter as shown in FIG. 8; specified are: three nodal points, P1, which forms the pivot of the fan, and P2 and P3, the terminal points of circular arc A1, as well as P4, the center point of arc A1. Points P1 through P4 are defined in terms of coordinate values X-Y, with the processing starting point P0 designated as the origin.

Figures 10A, 10B, 10C:
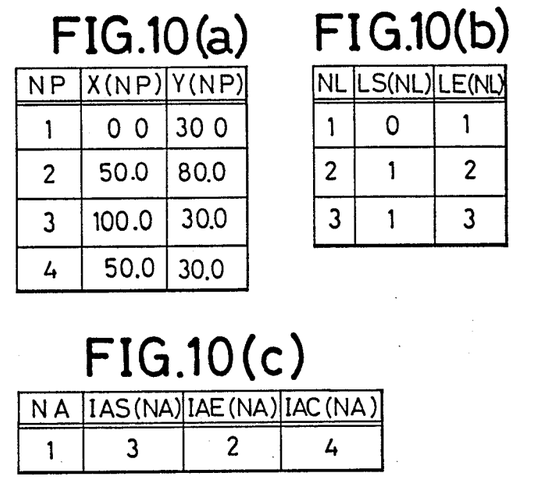
FIG. 10(a) is a diagram showing the data structure for each point in the pattern information.
FIG. 10(b) is a diagram showing the data structure for each line segment in the pattern information.
FIG. 10(c) is a diagram showing the data structure for each circular arc in the pattern information.

As shown in FIG. 10, defined points P1 through P4 are stored in memory as columns formed from pointer NP for assigning points, X coordinate value X(NP), and Y coordinate value Y(NP). In addition, the line segment (including the partial segment L1 on the approach locus from origin P0) is defined by specifying the starting and end points; pointer NL for assigning the line segment, starting point LS(NL), and end point LE(NL) are points respectively defined in pointer NP and stored in memory as the assigned columns shown in FIG. 10(b). The direction of the starting and end points is optional. The circular arc is defined by specifying the starting, end and midpoints, said starting point being defined directionally as the point from which the circular arc rotates in a counterclockwise (CCW) direction. Thereupon, pointer NA for assigning the circular arc, starting point IAS(NA), end point IAE(NA), and midpoint IAC(NA) are points respectively defined in pointer NP and are stored in memory as the assigned columns shown in FIG. 10(c).

Figure 9:
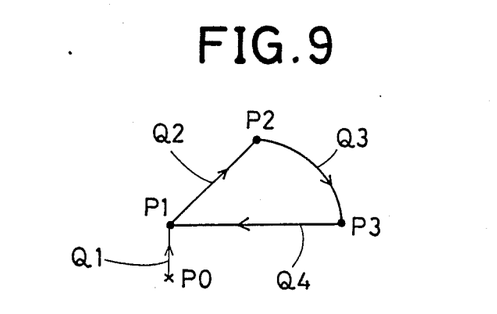
FIG. 9 is an explanatory diagram showing the tool path.
Figure 11:
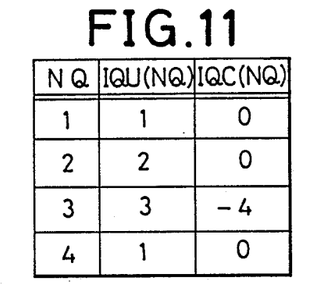
FIG. 11 is a diagram showing an example of the structure of tool path information.

The tool path is set by repeating the graphic functions defined heretofore. As shown in FIG. 9, an approach is made from origin P0 to point P1, and tool paths Q1, Q2, Q3 and Q4 are set rotating in a clockwise direction through the fan-shaped pattern. The tool path is specified via a range of points consisting of sequentially assigned nodes forming the target object and, when progressing over the circular arc, midpoints are collectively assigned. Thereupon, pointer NQ for assigning the tool path, nodes IQU(NQ) forming the target, and midpoints IQC(NQ) are points respectively defined by pointer NP and are stored in memory as the assigned columns shown in FIG. 11. The value zero (0) is entered to the midpoint IQC(NQ) for the line segment paths which form the tool path.

Thus, the patterns are calculated and said patterns are displayed on display means 14, for example, as shown in FIG. 9, from the tool path information and pattern information stored via the data structures as described in FIG. 10(a) through 10(c) and FIG. 11.

Figure 12:
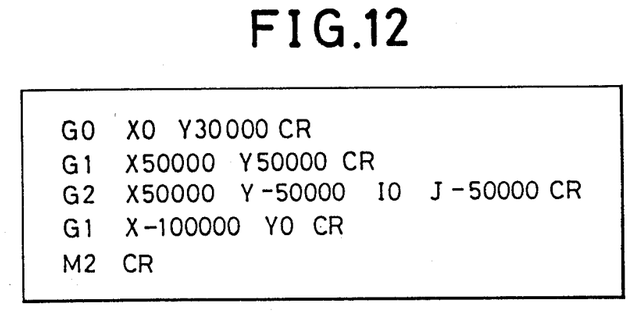
FIG. 12 is a diagram showing an example of NC programming.

Furthermore, said tool path is automatically converted to numerical control data from the structure of pattern information and tool path information shown in FIGS. 10(a) through 10(c) and FIG. 11, generating an NC program as shown in FIG. 12. The NC program is then, for example, punched on paper tape via paper tape puncher 20 and used in processing.

The present embodiment of the automatic programming device, in addition to the heretofore mentioned normal functions, is capable of reverse-generation of tool path information and pattern information with the data struture as shown in FIG. 10(a) through (c) and FIG. 11 from the NC program received on paper tape. Of course, the generated pattern and tool path information can be entered by the operator via the keyboard and may be manipulated in the same manner, said pattern is displayed on display means 14 where it is modified and edited, and can then be stored for future use on floppy disk device 19.

Figure 13:
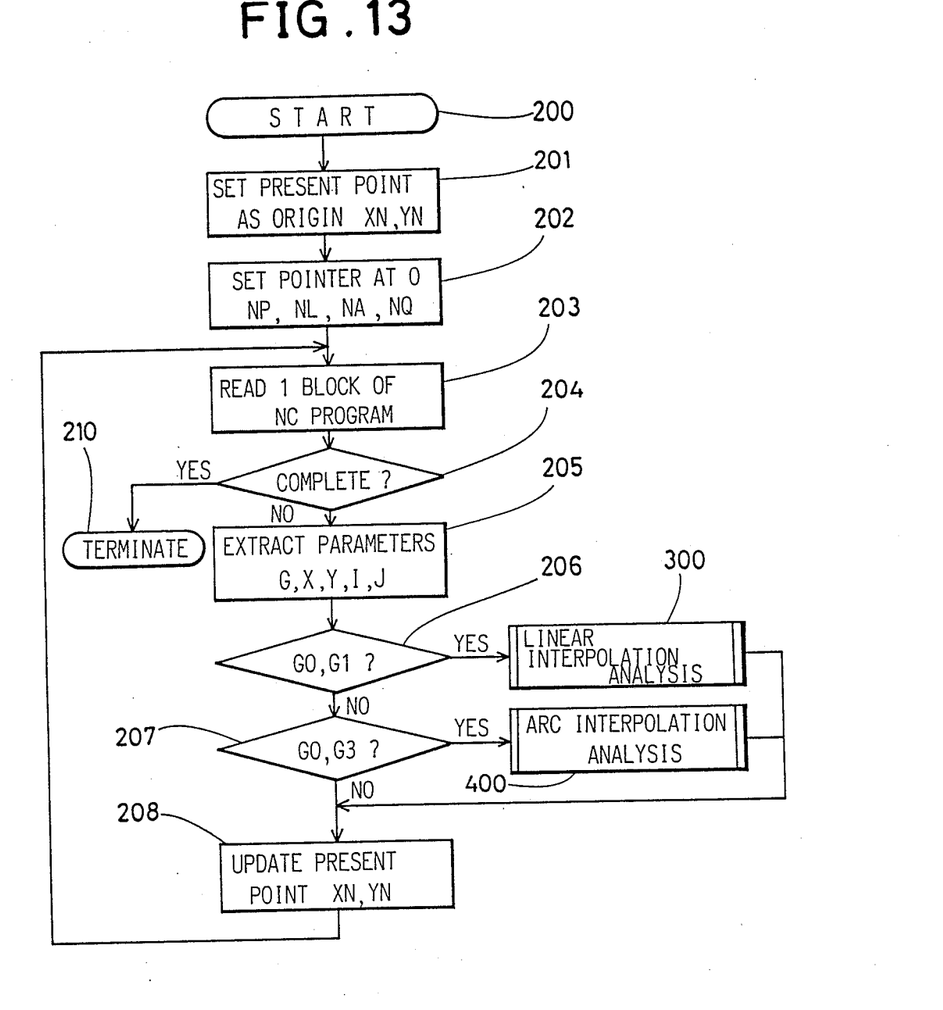
FIG. 13 is a flow chart showing the main routine in actual processing.
Figure 14:
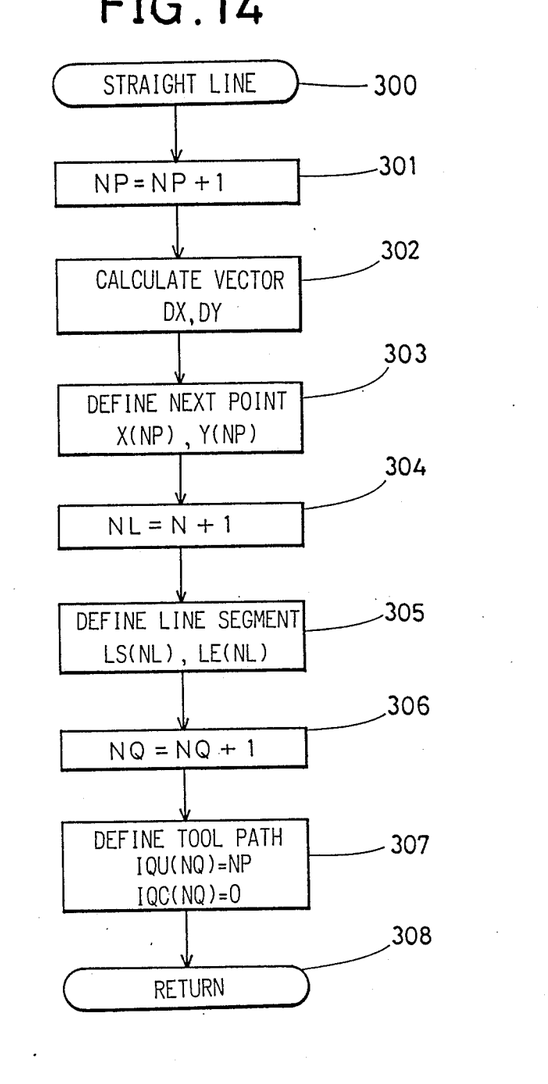
FIG. 14 is a flow chart showing the linear interpolation analysis routine in actual processing.
Figure 15:
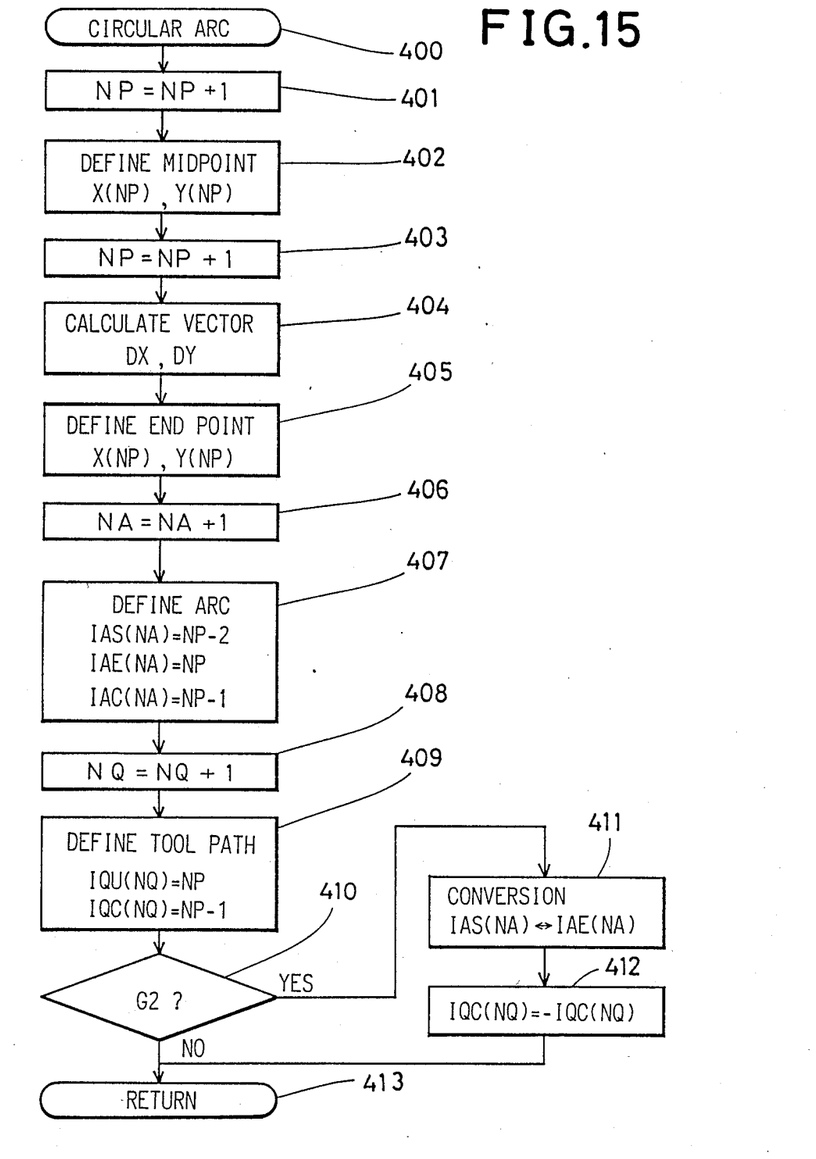
FIG. 15 is a flow chart showing the circular arc interpolation analysis routine in actual processing.

FIGS. 13 through 15 are flow charts showing the actual process wherein pattern and tool path information are generated from the NC program written in numerical control data. The NC program is hereinafter explained as described by an incremental system.

FIG. 13 is a flow chart showing the main routine.

When processing of main routine 200 starts, initially, in step 201, the present point position is set for the X-Y coordinate origin. Hereafter, XN and YN are used as variables expressing the coordinates of the present point position. Next, in step 202, each pointer, which assigns graphical elements, is initialized at zero (0). Said pointers are four in number: pointer NP, which assigns points; pointer NL, which assigns line segments; pointer NA, which assigns circular arcs; and pointer NQ, which assigns tool paths. This terminates the set-up processing, and the program continues to step 203.

In step 203, one block of the NC program received by paper tape, etc., is read and stored. Then, in step 204, a check is run to determine whether or not the NC program is concluded; if it is concluded, the program continues to step 210 and processing is complete. Normally, the program continues to step 205.

In step 205, the parameters (NC commands) related to the tool path are extracted. The parameters herein extracted are related to NC commands G, X, Y, I, and J. Thereupon, if the G command of said block is G0 or G1, the program continues from step 206 to the linear interpolation analysis routine of step 300 due to the linear interpolation analysis command. However, if the G command of said block is G2 or G3, the program continues from step 207 to the circular arc interpolation analysis routine of step 400 due to the circular arc interpolation analysis command.

With the completion of each analysis routine, 300 and 400, the program continues to step 208; the present point positions XN and YN are updated via the coordinates of the attained points determined in the respective analysis routines of steps 300 and 400. Thereupon, the program returns to step 203 and the aforesaid process repeats until the processing of the entire program is completed.

FIG. 14 is a flow chart showing linear interpolation analysis routine 300.

Firstly, a definition of the new point is executed. In step 301, the value of pointer NP, which assigns the point, is upgraded, and a new point is assigned as NP=NP+1. Next, in step 302, the vector (DX, DY) to the new point is calculated from the present point position (XN, YN). Thereupon, the values of the X command and Y command become, intact, DX and DY. Then, in step 303, the coordinates of the new point are calculated as X(NP)=XN+DX and Y(NP)=YN+DY, and the new point is thus defined. Thereafter, the values are stored in memory as shown in FIG. 10(a).

Next, a new line segment is defined. In step 304, the value of pointer NL, which assigns the line segment, is upgraded and the new line segment is defined. In step 305, the new line segment's starting point LS(NL) and end point LE(NL) are calculated and stored in memory as LS(NL)=NP−1 and LE(NL)=NP, respectively.

Finally, the new tool path is defined. In step 306, the value of pointer NQ, which assigns the tool path, is upgraded, and the next tool path is assigned. In step 307, nodes IQU(NQ), which form the target, are defined and stored in memory as point NP. Additionally, because the tool path is a straight line, the midpoint IQC(NQ) is set at zero (0).

Thus, analysis of a single linear interpolation block is completed, and the program returns from step 308 to step 208 of the main routine 200. In step 208, the coordinate values of X and Y for point NP, which is defined as the starting point of the straight line, is updated to the present point position as present point position XN and YN.

FIG. 15 is a flow chart showing the circular arc interpolation analysis routine 400.

Firstly, definitions of the new points are executed. The new points determined herein are the end point and midpoint of the circular arc. First the midpoint is determined, then the end point is determined. In step 401, pointer NP, which assigns the point, is upgraded and a new point is assigned. In step 402, the new point, i.e., the coordinates of the midpoint, are calculated as the vector (AI, AJ) in the direction of the midpoint added to the present point position (XN, YN). The vector (AI, AJ) is derived from the I command and the J command of the NC program. The new point, which is the midpoint, is defined and stored in memory as X(NP)=XN+AI and Y(NP)=YN+AJ. In step 403, pointer NP for assigning the end point is upgraded. In step 404, the vector (DX, DY) from the present point position to the circular arc end point is calculated, then, in step 405, the coordinates of the end point are calculated and stored in memory as X(NP)=XN+DX and Y(NP)=YN+DY.

Nest, a definition of the new circular arc is executed. The definition of the circular arc is executed via the assignments of the circular arc starting point, end point and midpoint. In step 406, pointer NA, which assigns the circular arc, is upgraded. Then, in step 407, the circular arc starting point, end point and midpoint are each defined and stored in memory as IAS(NA)=NP−2, IAE(NA)=NP, and IAC(NA)=NP−1, respectively.

Thereafter, a new tool path is defined. In step 408, the value of pointer NQ, which assigns the tool path, is upgraded, then the next tool path is assigned. In step 409, the nodes IQU(NQ), which form the target, and the midpoint IQC(NQ) are defined and stored in memory as point NP and point NP−1, respectively.

In step 410, the G command is checked to determine whether or not it is G2. If the G command is G2, then the circular arc rotates in a clockwise direction, however, because the definition of the circular arc must be defined in a counterclockwise direction, the program continues to step 411 in order to effect said modification. In step 411, the circular arc starting point IAS(NA) defined in step 407 and end point IAE(NA) are replaced. In consequence of said process, the circular arc is defined in a counterclockwise direction. Thereupon, in step 412, a negative sign is added to the tool path information midpoint IQC(NQ), and the tool path is made explicitly clockwise.

However, if the G command in step 410 is not G2 but G3, the circular arc starting point IAS and end point IAE defined in step 307 are not modified because the circular arc is in a counterclockwise direction; the process is completed intact and the program continues to step 413.

Thus, analysis of a single circular arc interpolation block is completed and, from step 413, the program returns to step 208 of the main routine. In step 208, the values of the coordinates for point NP, which is defined as the circular arc end point, are updated to the present point position as present point position XN and YN.

As heretofore described, the present invention generates pattern information (refer to FIGS. 10(a) to (c)), which is specified by each graphical element of points, line segments and circular arcs, and generates tool path information (refer to FIG. 11), which is specified via nodal sequence designation, and said invention generates said information from the NC program (refer to FIG. 12), which is written in numerical control data received via paper tape or other means.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. An NC program editing and automatic programming device comprising:
   temporary memory means for storing graphical data which includes pattern information defining a pattern of a tool path and tool path information defining a route of the tool path;
   automatic programming means, coupled to said temporary memory means for automatically generating an NC processing program from said graphical data by converting said graphical data in said temporary memory means into numerical control data;
   reading means for reading an input NC processing program generated in a numerical control data language, said input NC processing program being one which is generated by either of said automatic programming means or a programming device other than said automatic programming means;
   pattern-calculation means, responsive to said input NC processing program for calculating tool path information indicative of the tool path by said graphical data;
   display means for displaying said graphical data calculated by said pattern-calculation means; and
   analyzing-calculation means for creating new pattern information and new tool path information by modifying and editing each block of the NC processing program which is read by said reading means and displayed as a pattern on said display means via said pattern-calculation means;
   wherein said automatic programming means automatically generates a new NC processing program from the new pattern information and the new tool path information created by said analyzing-calculation means.

2. An automatic programming device as claimed in claim 1, wherein said automatic programming means comprises:
   means for defining an origin of coordinates as a starting point;
   means for defining said new pattern information by determining coordinate values of plural graphical elements of points for specifying the new pattern of the new tool path, for determining center points of circular arcs for connecting two selected nodal points of said plural graphical elements of points, as starting points and end points of said circular arcs, using said original of said coordinates as a working starting point, and for designating starting points and end points of line segments for connecting said plural graphical element of points including said working starting point; and
   means for defining the new tool path information by a sequence of said nodal points for successively designating the nodal points and the end point being a target to which a tool proceeds from said working starting point.

3. An NC program editing and automatic programming device comprising:
   reading means for reading an input NC processing program including plural blocks generated in numerical control data language from a program source;
   pattern-calculation means, responsive to said input processing program, for calculating pattern information and tool path information showing a tool path;
   display means for displaying said pattern information and tool path information calculated by said pattern-calculation means;
   an analyzing-calculation means for creating new pattern information and new tool path information by modifying and editing each block of the NC processing program which is read by said reading means and displayed as a pattern on said display means using said pattern information and tool path information calculated by said pattern-calculation means; and
   means for automatically generating a new NC processing program from the new pattern information and the new tool path information created by said analyzing-calculation means.

* * * * *